US006287723B1

(12) United States Patent
Maeda et al.

(10) Patent No.: US 6,287,723 B1
(45) Date of Patent: *Sep. 11, 2001

(54) ALKALINE SECONDARY BATTERY HAVING AN ANODE COMPRISING A NON IONIC POLYMER BINDER

(75) Inventors: Koichiro Maeda; Toshihiro Inoue; Kenji Wada; Hidekazu Haneda, all of Kawasaki; Haruhisa Yamamoto, Tokyo, all of (JP)

(73) Assignee: Nippon Zeon Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/124,896

(22) Filed: Jul. 30, 1998

(30) Foreign Application Priority Data

Jul. 31, 1997 (JP) .................................................. 9-220101

(51) Int. Cl.$^7$ ..................................................... H01M 6/04
(52) U.S. Cl. .......................... 429/206; 429/213; 429/214; 429/215; 429/216; 429/217
(58) Field of Search .................................... 429/206, 213, 429/214, 216, 217, 215

(56) References Cited

U.S. PATENT DOCUMENTS

| | | | |
|---|---|---|---|
| 4,849,312 | * 7/1989 | Mitsuyasu et al. | 429/217 |
| 5,053,292 | 10/1991 | Hasebe et al. . | |
| 5,348,820 | * 9/1994 | Suga et al. | 429/216 |
| 5,378,560 | 1/1995 | Tomiyama . | |
| 5,691,085 | 11/1997 | Coco et al. . | |
| 5,780,184 | * 7/1998 | Coco et al. | 429/217 |
| 5,848,351 | * 12/1998 | Hoshino et al. | 428/550 |

OTHER PUBLICATIONS

Japanese Abstract: JPA9063586, Mar. 7, 1997, "Orgaganic Electrolyte Secondary Battery".
Japanese Abstract: JPA6140033, May 20, 1994, "Metal Hydride Storage Battery".
Japanese Abstract: JPA4272656, Sep. 29, 1992, "Hydrogen Storage Alloy Electrode for Nickelhydrogen Secondary Battery".
Japanese Abstract: JPA4206345, Jul. 28, 1992, "Secondary Battery".

* cited by examiner

*Primary Examiner*—Gabrielle Brouillette
*Assistant Examiner*—Angela J. Martin
(74) *Attorney, Agent, or Firm*—Birch, Stewart, Kolasch & Birch, LLP

(57) ABSTRACT

An alkaline secondary battery comprising an electrolyte such as aqueous solution of potassium hydroxide, at least one cathode electrode, at least one anode electrode having an anode active material layer, and a separator such as nonwoven fabric between the anode electrode and the cathode electrode, in which the anode active material layer containing an anode active material such as a hydridable alloy or a cadmium alloy, and an anode binder which includes a nonionic polymer produced by emulsion polymerization of a nonionic monomer in the presence of a nonionic surfactant, and in which the electrolyte essentially surrounds the cathode electrode and the anode electrode.

27 Claims, No Drawings

ALKALINE SECONDARY BATTERY HAVING AN ANODE COMPRISING A NON IONIC POLYMER BINDER

FIELD OF THE INVENTION

This invention relates to an alkaline secondary battery comprising at least one anode electrode having an anode active material layer which contains an anode active material and a binder, and more particularly to an alkaline secondary battery improved by the specific binder for the anode electrode.

DESCRIPTION OF THE RELATED ART

An alkaline secondary battery comprises an electrolyte, at least one cathode electrode and at least one anode electrode, in which the electrolyte at least partially surrounds the cathode electrode and the anode electrode. Also there is optionally a separator which lies between the cathode electrode and the anode electrode. The cathode electrode has a cathode metallic collector and a cathode active material layer bound thereon. The cathode active material layer is formed by binding, with a cathode binder, a cathode active material such as nickel hydroxide or nickel oxy-hydroxide, a conductive material such as carbon, and additives such as cobalt powder. The anode electrode has an anode metallic collector such as punched metal porous metallic plate, foamed metallic plate or sintered netlike metal fibeir plate, and an anode active material layer bound thereon. The anode active material layer is formed by binding, with an anode binder, an anode active material such as a hydridable alloy or a cadmium alloy, and a conductive material such as carbon, nickel powder or the like. The anode electrode is generally produced by blending the anode active material, the conductive material, the anode binder and water to obtain a paste, followed by spreading the paste on the anode metallic collector, and then drying it. It is necessary that the anode binder is a polymer capable of strongly binding the collector, the anode active material and the conductive material.

A water-insoluble polymer is usually preferred as the anode binder. Examples of water-insoluble polymers are fluorine-containing polymers such as poly-(tetrafluoroethylene) (=PTFE); ethylene-propylene-diene rubber (=EPDM), styrene-ethylene-butene-styrene copolymer (=SEBS) and the like. Additionally a water-soluble polymer may be used with the above water-insoluble polymer. Examples of water-soluble polymers are polyvinylalcohol, poly-(acrylic acid salt), water-soluble cellulose derivatives, poly-(ethylene glycol), poly-(vinyl pyrrolidone) and the like (see the Japanese unexamined patent publications of JP-A-03-283362, JP-A-04-1 21958, JP-A-04-206345, JP-A-04-272656, JP-A-06-140033, and JP-A-09-63589).

These anode binders, however, do not give sufficient binding between the collector and the anode active material layer resulting in the anode active material layer peeling from the anode collector overtime by repeat of charge and discharge. Thus properties such as battery capacity are reduced.

SUMMARY OF THE INVENTION

An object of the present invention is to provide an alkaline secondary battery having a battery capacity which remains stabilized over repeated cycles of charge and discharge.

Another object of the present invention is to provide an anode electrode for the alkaline secondary battery having an anode active material layer tightly bound on an anode collector.

Another object of the present invention is to provide a method of producing the above anode electrode for the alkaline secondary battery.

The objects of the present invention can be achieved by using an anode binder which comprises a nonionic polymer produced by an emulsion polymerization in the presence of a nonionic surfactant. The anode active material layer containing an anode active material, a conductive material and the like are tightly bound on the anode collector, thereby stabilizing the battery capacity even through repeated cycles of charge and discharge.

In one aspect of the present invention, there is provided an alkaline battery comprising an electrolyte, at least one cathode electrode and at least one anode electrode having an anode collector and an anode active material layer on the anode collector, in which the anode active material layer contains an anode active material and an anode binder which includes a nonionic polymer produced by emulsion polymerization of at least one nonionic monomer in the presence of a nonionic surfactant, and the cathode electrode and the anode electrode are essentially surrounded by an electrolyte.

In another aspect of the present invention, there is provided an anode electrode for a secondary battery comprising an anode collector and an anode active material layer supported on the anode collector, in which the anode active material layer contains an anode active material and an anode binder including a nonionic polymer produced by emulsion polymerization of at least one nonionic monomer in the presence of a nonionic surfactant.

In another aspect of the present invention, there is provided a method for producing an anode electrode for a secondary battery comprising the steps of blending an anode active material, an anode binder and water to obtain a paste; spreading the paste on a anode collector; and then drying the paste. The anode binder comprises a nonionic polymer produced by emulsion polymerization of at least one nonionic monomer in the presence of a nonionic surfactant

DETAILED DESCRIPTION OF THIS INVENTION

An anode electrode for a secondary battery comprises an anode collector and an anode active material layer supported on the anode collector. The anode active material layer contains an anode active material such as a hydridable alloy or a cadmium alloy, and an anode binder.

The preferred anode binder of the present invention comprises a nonionic polymer. The nonionic polymer may not substantially contain ionizable group, and has an electric conductivity of generally not more than 2000 $\mu$S/cm, preferably not more than 1000 $\mu$S/cm, more preferably not more than 500 $\mu$S/cm. The electric conductivity is evaluated by dispersing the nonionic polymer in water to obtain a 10% by weight polymer-content latex of the nonionic polymer, and measuring electric conductivity of the latex.

The nonionic polymer of the present invention is obtained by emulsion polymerization of at least one nonionic monomer in the presence of a nonionic surfactant.

The nonionic surfactant is preferably a polyoxyethylene alkyl ether such as polyoxyethylene lauryl ether, polyoxyethylene cetyl ether, polyoxyethylene stearyl ether or polyoxyethylene oleyl ether; polyoxyethylene alkyl aryl ether such as polyoxyethylene nonyl phenyl ether or polyoxyethylene octyl phenyl ether; polyethylene glycol fatty acid ester, polyethylene glycol phosphate; sorbitol fatty acid ester; fatty acid monoglyceride; polyglycerine fatty acid ester; propyleneglycol fatty acid ester; cane sugar fatty acid ester, polyoxyethylene-polyoxypropylene block copolymer; polyoxyethylene-polyoxypropylene alkyl ether; ethylene oxide derivative of alkyl phenol formalin condensate; polyoxyethylene glycerine fatty acid ester, polyoxyethylene hardened castor oil; polyoxyethylene sorbitol fatty acid ester; fatty acid alkanolamide; polyoxyethylene fatty acid amide; and the like. Polyoxyethylene alkyl aryl ether is preferable. The nonionic surfactant can be used either alone or in combination with a water soluble polymer. Alternatively, the water soluble polymer may be used alone. The water soluble polymer of the present invention includes gelatin, polyvinylpyrrolidone, poly-(sodium acrylate), or polyvinylalcohol having saponification value of not less than 75% and polymerization degree of not less than 700, and the like.

The anionic surfactant may be added to stabilize the emulsion polymerization. The amount of the anionic surfactant, based on the total solid amount of surfactant, should be not more than 10% by weight, preferably not more than 5% by weight. As the anionic surfactant, examples are alkyl aryl sulfonate such as dodecyl benzene sodium sulfonate, dodecyl phenyl ether sodium sulfonate or the like; sulfosuccinate such as dioctyl sodium sulfosuccinate, dihexyl sodium sulfosuccinate or the like; salt of fatty acid such as sodium laurate or the like; ethoxy sulfate such as polyoxyethylene lauryl ether sodium sulfate, polyoxyethylene nonyl phenyl ether sodium sulfate or the like; alkane sulfonate; alkyl ether sodium phosphate; and the like.

The total amount of the surfactant used in this invention, based on 100 parts by weight of the total amount of monomer required in order to obtain the nonionic polymer, is generally about 0.01 to about 20 parts by weight. In a multi step polymerization, the total amount of monomer required in order to obtain the nonionic polymer is the sum of the amount of monomer required in each step, and the total amount of the surfactant is the sum of the amount of the surfactant used in each step. Also the total amount of the other ingredients are calculated in the same manner.

The monomer of the present invention, in order to obtain the nonionic polymer, does not substantially have an ionizable group, that is a nonionic monomer which does not ionize. The preferred examples of the nonionic monomer are an acrylic acid ester such as methyl acrylate, ethyl acrylate, propyl acrylate, isopropyl acrylate, n-butyl acrylate, isobutyl acrylate, n-amyl acrylate, isoamyl acrylate, n-hexyl acrylate, 2-ethylhexyl acrylate, hydroxypropyl acrylate, lauryl acrylate and the like; an crotonic acid ester such as methyl crotonate, ethyl crotonate, propyl crotonate, butyl crotonate, isobutyl crotonate, n-amyl crotonate, isoamyl crotonate, n-hexyl crotonate, 2-ethylhexyl crotonate, hydroxypropyl crotonate and the like; a methacrylic acid ester such as methyl methacrylate, ethyl methacrylate, n-butyl methactylate, isobutyl methacrylate, tert-butyl methacrylate, 2-ethylhexy methacrylate, lauryl methacrylate, tridodecyl methacrylate, stearyl methacrylate and the like; a conjugated diene such as 1,3-butadiene, isoprene, 2,3-dimethyl butadiene, piperirene and the like; a styrene derivative monomer such as styrene, alpha-methyl styrene, beta-methyl styrene, p-tert-butyl styrene, chlorostyrene; a nitrile monomer such as acrylonitrile, methacrylonitrile and the like; an acrylamide derivative monomer such as acrylamide, N-methylol acrylamide, N-butoxymethyl acrylamide and the like; a methacrylamide derivative monomer such as methacrylamide, N-methylol methacrylamide, N-butoxymethyl methacrylamide and the like; glycidyl group containing monomer such as glycidyl acrylate, glycidyl methacrylate, allyl glycidyl ether and the like; amino group containing methacrylic acid monomer such as dimethylaminoethyl methacrylate, diethylaminoethyl methacrylate and the like; alcohoxy group containing methacrylic acid monomer such as methoxy poly-ethyleneglycol monomethacrylate and the like. The more preferred nonionic monomer is conjugated diene, styrene derivative monomer, nitrile monomer and alcohoxy group containing methacrylic acid monomer. It is even more preferable to use acrylic acid ester alone, or a combination of acrylic acid ester and a copolymerizable monomer therewith. The combination of an acrylic acid alkyl ester, in which the alkyl has carbon atom of 1 to 12, preferably 4 to 8, and a copolymerizable monomer therewith is especially preferable in order to obtain the secondary battery having a good cyclic property of charge and discharge.

A polymer rich in an ionic monomer, which is ionizable, such as the unsaturated mono-carboxylic acid monomer which include acrylic acid, methacrylic acid and the like, are not included as part of the present invention because the ionic monomer has such a high electrolytic dissociation that an undesirable reaction with the electrolyte occurs slowly. As such the performance of binder is undesirably reduced. When the ionic monomer is used to give the desirable property to the polymer as the binder, the amount of the ionic monomer, based on the total amount of monomer, is generally not more than 20% by weight, preferably not more than 10% by weight, more preferably not more than 5% by weight.

The nonionic polymer of the present invention is obtained by emulsion polymerization of the nonionic monomer in the presence of the nonionic surfactant. Any standard method of emulsion polymerization may be used, however, a multi-step emulsion polymerization such as seed emulsion polymerization and the like has the benefit that a polymer particle obtained thereby is uniform in size. A homogeneous anode electrode can be prepared using the uniform size polymer particle.

A monomer adding method in the emulsion polymerization may be any method of a lump addition, a serial addition, or an installment addition. In the monomer adding method, either the monomer itself or the emulsion of the monomer may be added. A hydrophilic organic solvent such as alcohol, ketone and so on may be added in the polymerization system if needed.

A polymerization temperature and a polymerization period depend on the method of polymerization, the nature of the polymerization initiator, and the like. The polymerization temperature is generally about 30 to about 200° C., preferably about 30 to about 90° C., and the polymerization period is generally about 0.5 to about 20 hours.

As the polymerization initiator, a persulfate salt such as ammonium persulfate, potassium persulfate; organic or inorganic peroxide may be used either alone or in combination. In the present invention, it is preferable to use a nonionic polymerization initiator. Specific examples of the nonionic polymerization initiator include a ketone peroxide such as methyl ethyl ketone peroxide, methyl isobutyl ketone peroxide, cyclohexanone peroxide, methylcyclohexanone peroxide, 3,5,5-tri-methylcyclohexanone peroxide; dialkylperoxide such as di-tert-butyl peroxide, tert-butyl alpha-cumyl peroxide, dicumyl peroxide, 1,3-bis-(tert-butyl peroxy isopropyl) benzene, 1,4-bis-(tert-butyl peroxy isopropyl) benzene, 2,5-dimethyl-2,5di(tert-butyl peroxy) hexane, 2,5-dimethyl-2,5-di(tert-butyl peroxy) 3-hexyne; diacylperoxide such as acetyl peroxide, propionyl peroxide, isobutyryl peroxide, octanoyl peroxide, 3,5,5- trimethylhexanoyl peroxide, decanoyl peroxide, lauroyl peroxide, benzoyl peroxide, p-chlorobenzoyl peroxide, 2,4-dichlorobenzoyl peroxide, acetyl cyclohexane surfonyl peroxide; hydroperoxide such as t-butyl hydroperoxide, cumene hydroperoxide, diisopropyl benzene hydroperoxide, p-menthane hydroperoxide, 2,5-dimethyl hexane-2,5-dihydro peroxide, 1,1,3,3-tetramethyl butyl hydroperoxide; peroxy dicarbonate such as di-2-ethylhexylperoxy dicarbonate, diisopropylperoxy dicarbonate, di-sec-butylperoxy dicarbonate, di-n-propylperoxy dicarbonate, dimethoxyisopropylperoxy dicarbonate, di-3-methoxybutylperoxy dicarbonate, di-2-ethoxyethylperoxy dicarbonate, bis(4-tert-butylcyclohexyl) peroxy dicarbonate, tert-butyl peroxy isopropyl carbonate; peroxy ketal such as 1,1-bis-(tert-butylperoxy)-3,3,5-trimethyl cyclohexane, n-butyl-4,4-bis(tert-butylperoxy) valerate, 2,2-bis(tert-butylperoxy) butane; alkyl peroxyester such as tert-butylperoxy acetate, tert-butylperoxy isobutylate, tert-butylperoxy octoate, tert-butylperoxy decanoate, di-tert-butylperoxy phthalate, di-tert-butylperoxy isophthalate, tert-butylperoxy laurylate, 2,5-dimethyl-2,5-dibenzoylperoxy hexane; azo nitrile compound such as 2,2'-azo bisisobutylonitrile, 2,2'-azo bis(2,4-dimethylvaleronitrile), 2,2'-azo bis(4-methoxy-2,4-dimethylvaleronitrile), 2,2'-azo bis(2-(hydroxymethyl)propionitrile), 1,1-azobis (cyclohexane 1-carbonitrile), 2-(carbonylazo) isobutylonitrile, 2-phenyl azo-4-methoxy-2,4-dimethyl valeronitrile, 2,2'-azo bis(2-methylbutylonitrile); azo amide compound such as 2,2'-azo bis(2-methyl propionamide) dihydrate, 2,2'-azo bis(2-methyl-N-(1,1-bis(hydroxymethyl) ethyl)propionamide), 2,2'-azo bis( 2-methyl-N-(1,1-bis (hydroxymethyl)-2-hydroxyethyl)propionamide); alkyl azo compound such as 2,2'-azo bis(2-methylpropane), dimethyl 2,2'-azo bis(2-methylpropionic acid), dimethyl 2,2'-azo-bis (isobutylate); azo acid compound such as 4,4'-azo bis(4-cyanopentanoic acid); amidine compound such as 2,2'-azo bis(4,4'-dimethylene isobutyl amidine) dihydrochloride and the like. These initiators may be used either alone or in combination.

The amount of the initiator, based on 100 parts by weight of the total amount of the monomer, is generally 0.01 to 30 parts by weight, preferably 0.05 to 20 parts by weight. If the total amount of the initiator is too low, it takes too long to polymerize the monomer, and productivity is reduced. If the total amount of the initiator is too high, undesirable coagulation occurs.

The nonionic polymer of the present invention is a homopolymer obtained by homopolymerization of the above cited monomers or a copolymer obtained by copolymerization of a combination of the above cited monomers, in which the copolymer may be either a random copolymer or a block copolymer. Preferably the nonionic polymers include homo- or co-polymer of (meth)acrylate monomer, or copolymer of (meth)acrylate monomer and a copolymerizable monomer such as polyethyl acrylate, polybutyl acrylate, poly-2-ethylhexyl acrylate, butylacrylate-2-ethylhexyl acrylate copolymer, ethyl acrylate-styrene copolymer, n-butyl acrylate-styrene copolymer, 2-ethylhexyl acrylate-styrene copolymer, methyl acrylate-styrene- 1,3-butadiene copolymer, n-butyl acrylate-methyl methacrylate-styrene copolymer, 2-ethylhexyl acrylate-methyl acrylate-methoxy polyethyleneglycol mono-methacrylate copolymer. The highly elastic nonionic polymer, which has a polar group such as ester group, hydroxy group, ether group and the like, has a glass transition temperature of not more than room temperature, preferably not more than 0° C., more preferably not more than −20° C. The highly elastic nonionic polymer is excellent in bonding strength and bonding durability. The glass transition temperature was evaluated by a temperature point that a dielectric loss of the polymer critically changes under the rising rate of 1° C./min.

Moreover, in order to enhance the bonding strength and bonding durability of the nonionic polymer, the nonionic polymer may be preferably crosslinked by a crosslinking agent such as a radical crosslinking agent or a crosslinkable monomer. Where the radical crosslinking agent is used, the radical crosslinking agent may be added after or during the polymerization step. Where the crosslinkable monomer is used as the crosslinking agent, the crosslinkable monomer may be added, with the polymerization initiator after or during the polymerization step.

As the crosslinking agent, examples of the radical crosslinking agent are peroxide such as benzoyl peroxide, dichlorobenzoyl peroxide, dicumyl peroxide, di-tert-butyl peroxide, 2,5-dimethyl-2,5-di(peroxide benzoate) hexyne-3, 1,4-bis(tert-butylperoxyisopropyl) benzene, lauroyl peroxide, tert-butyl peracetate, 2,5-dimethyl-2,5-di(tert-butyl peroxy) hexyne-3,2,5-trimethyl-2,5-di(tert-butyl peroxy)hexane, tert-butyl perbenzoate, tert-butylperphenylacetate, tert-butylperisobutylate, tert-butylper-sec-octylate, tert-butylperpiperate, cumylperpiperate, tert-butylperdiethylacetate. Examples of the crosslinkable monomer are di-methacrylate compound as ethylene glycol di-methacrylate, diethyleneglycol di-methacrylate; trimethacrylate compound as trimethylolpropane trimethacrylate; diacrylate compound as polyethylene glycol diacrylate, 1,3-butyleneglycol diacrylate; triacrylate compound as trimethylolpropane triacrylate; divinyl compound as divinyl benzene and the like. It is preferable to use a crosslinkable monomer such as a di-methacrylate which include ethylene glycol di-methacrylate or divinyl compound such as divinyl benzene. The total amount of the crosslinking agent, depends on the nature of the monomer and reaction conditions, and is generally 0.05 to 30 parts by weight, preferably 0.5 to 15 parts by weight based on 100 parts by weight of the monomer.

The nonionic polymer of the present invention, may take the form of a sphere, a confetto-like shape, or indeterminate form, however the form is not limited. The nonionic polymer particle size is generally 0.005 to 1000 micron, preferably 0.01 to 100 micron, more preferably 0.02 to 50 micron. If the particle size is too large, the internal resistance of the anode electrode increases since the contact area with the anode active material is reduced. If the particle size is too small, the required amount of the binder increases and the surface of the anode active material becomes undesirably covered. The nonionic polymer particle size was evaluated by measuring the major axis of 100 pieces of polymer particles photographed with a transmitting electron microscope, and calculating the mean of the measured major axis.

The amount of the nonionic polymer included in the binder, based on the amount of solid ingredient of the binder(the sum amount of the nonionic polymer and polymer(X) described infra), is generally 1 to 70% by weight, preferably 5 to 60% by weight, more preferably 10 to 45% by weight.

In the present invention, it is preferable to prepare the binder so as to include a polymer(hereinafter referred to as "polymer(x)") other than the above nonionic polymer in combination with the above nonionic polymer, for ease of production of the anode electrode and safety enhanced of the secondary battery.

Polymer(X) comprises either a water-insoluble polymer or a water-soluble polymer, or a combination of both.

Preferred examples of the water-insoluble polymer have very low hydrophilic character, that is they are water-repellent, and may be a fluorine containing polymer such as polytetrafluoroethylene, polyvinylidenefluoride, fluororubber; polyolefin typified polyethylene, polypropylene; and the like; co- or homo-polymer of conjugated diene monomer, which are elastomeric, such as polybutadiene, polyisoprene, styrene-1,3-butadiene copolymer, styrene-isoprene copolymer, styrene-1,3-butadiene,isoprene copolymer, 1,3-butadiene-acrylonitrile copolymer, 1,3-butadiene-isoprene-acrylonitrile copolymer, styrene-acrylonitrile1,2-butadiene copolymer, styrene-acrylonitrile-1,3-butadiene-itaconic acid copolymer, styrene-acrylonitrile-1,3-butadiene-methylmethacrylate-fumaric acid copolymer, styrene-1,3-butadiene-itaconic acid-methylmethacrylate-acrylonitrile copolymer, polystyrene-polybutadiene block copolymer.

The binder of the present invention is distinguished by enhanced binding strength resulting from the combination of the nonionic polymer and the water-repellent polymer. Also an increase of the battery's internal pressure by repeat of charge and discharge can be suppressed by the combination of the nonionic polymer and the water-repellent polymer, especially the fluorine containing polymer.

As the water-soluble polymer, examples are cellulose polymer such as carboxymethylcellulose, methylcellulose, hydroxypropyl cellulose; polyacrylate such as poly-(acrylic acid sodium salt); polyvinylalcohol, polyethylene oxide, polyvinylpyrrolidone, copolymer of acrylic acid or salt thereof and vinylalcohol, copolymer of maleic anhydride, maleic acid or fumaric acid, and vinylalcohol; denatured polyvinylalcohol, denatured poly(acrylic acid). It becomes easy to spread a paste on a collector and to regulate apparent viscosity by using the water-soluble polymer, in which the paste is obtained by blending an anode active material and an anode binder with water.

The amount of the polymer(X), based on the total amount of solid ingredient of the binder(the sum amount of the nonionic polymer and the polymer(X)), is generally 30 to 99% by weight, preferably 40 to 95% by weight, more preferably 55 to 90% by weight.

Regarding the components of polymer(X), the weight proportion of the water-insoluble polymer and the water-soluble polymer is generally 100/0 to 10/90, preferably 100/0 to 20/80, more preferably 80/20 to 30/70.

The amount of the binder based on 100 parts by weight of the anode active material, is generally 0.05 to 20 parts by weight, preferably 0.1 to 10 parts by weight. If the amount of the binder is too small, binding strength of the anode active material on the anode collector is insufficient, resulting in peeling of the anode active material, and reduced battery capacity. If the amount of the binder is too large, battery properties are reduced since the binder prevents an ionic migration on the surface of the anode active material.

The anode active material, may be either a hydridable alloy or a cadmium alloy. It is preferable to use the hydridable alloy. Herein a hydridable alloy is defined as an alloy capable of storing hydrogen. The hydridable alloys include the $AB_5$ type alloy of rare earth elements such as $LaNi_5$; the $AB/A_2B$ type alloy of titanium such as $TiNi$, $Ti_2Ni$; the $AB_2$ type alloy such as $TiV_2$; the LaNiS type alloy using misch metal(hereinafter referred to as Mm) instead of La or using Mn or Co instead of Ni such as $LaNi_2Co_3$, $MmNi_4Co$, $MmNi_2Co_3$ wherein M is represented by (Ni,Mn,Co, . . . ) and m is presented by (Al,Cr, . . . ); and the like.

A conductive material may be included in the anode material layer. Preferred examples of the conductive material include nickel powder, cobalt oxide, titanium oxide, carbon and the like. Preferred examples of the carbon include acetylene black, furnace black, graphite, carbon fiber, flaren, and so on.

Where the conductive material is used, the amount of the conductive material, based on 100 parts of the anode active material, is generally 0.2 to 10 parts by weight.

Preferred examples of the anode collector include punched metal, expanded metal, porous metallic plate, foamed metallic plate or sintered netlike metal fiber plate and the like.

A method of producing the anode electrode for the secondary battery, comprises the step of kneading the hydridable alloy, the anode binder, water and optionally the conductive material to obtain an anode paste, then the anode paste is spread on the anode collector, and dried. Said anode binder includes a nonionic polymer produced by emulsion polymerization of at least one nonionic monomer in the presence of a nonionic surfactant. In the spreading step, the anode paste may be applied to the anode collector, or the anode collector may be dipped in the anode paste.

A cathode electrode of the present invention may be one used in an ordinary secondary battery. The cathode electrode may be obtained by the following method. A cathode active material(such as nickel hydroxide, nickel oxide, the conductive material such as cobalt monoxide, cobalt dioxide, cobalt hydroxide, metal cobalt) and a cathode binder(such as carboxymethylcellulose, methylcellulose, poly sodium acrylic acid and so on) are kneaded to obtain the cathode paste. The cathode paste is applied on a cathode collector. The cathode collector, of which the shape is net, plate and the like, is made of metallic substrate such as nickel, stainless steel, nickel plated resin; foamed metallic substrate, fiber substrate or sintered netlike metal fiber substrate and the like. The cathode paste on the cathode collector is dried, and then is formed with roll press equipment.

The secondary battery of the present invention further comprises a separator. The separator is affixed between the cathode electrode and the anode electrode. The separator may be one used in the ordinary secondary battery. Preferred examples of the separator include polyethylene non-woven fabric, polypropylene non-woven fabric, polyamide non-woven fabric and hydrophilic treated thereof.

The electrolyte may be an aqueous solution of potassium hydroxide, an aqueous solution of potassium hydroxide and sodium hydroxide, an aqueous solution of potassium hydroxide and lithium hydroxide, or an aqueous solution of potassium hydroxide, sodium hydroxide and lithium hydroxide.

The secondary battery comprises the electrolyte, the cathode electrode and the anode electrode, in which the cathode electrode and the anode electrode are essentially surrounded by the electrolyte. The secondary battery may further comprise a separator between the cathode electrode and the anode electrode. The secondary battery may be produced by ordinary methods such as by enclosing the electrolyte, the cathode electrode and the anode electrode in a metallic cell case.

A secondary battery comprising the anode electrode of this invention has a good cyclic property. Especially the anode electrode using the hydridable alloy as the anode active material is preferable for the alkaline secondary battery.

The invention will now be described specifically by the following examples that by no means limit the scope of the invention. In the examples parts or % are by weight unless otherwise specified.

An electric conductivity was evaluated by measuring latex containing 10 parts by weight of the objective polymer with digital electric conductivity measuring equipment ("Model CM-117" produced by KYOTO Electron Industry Co.). Polymer particle size was evaluated by measuring major axis of 100 pieces of the polymer particles photographed with a transmitting electron microscope, and calculating the mean of the measured major axis.

EXAMPLE 1

46 parts of ion exchanged water, 30 parts of styrene, 65parts of 2-ethylhexyl acrylate, 3 parts of polyoxyethylene nonyl phenyl ether having average polyoxyethylene polymerization degree of 85 ("Emulgen985" as Trade name, produced by KAO Co.), and 2.75 parts of 2,2'-azobis(2-methyl-N-(2-hydroxyethyl)propion amide ("VA-086" as Trade Name, produced by WAKO-JUNYAKU Ind. Co.) were mixed to obtain a monomer emulsion for second stage polymerization.

In a polymerization reactor, 58 parts of ion exchanged water and 2 parts of polyoxyethylene nonyl phenyl ether having average oxyethylene polymerization degree of 85 ("Emulgen985" as Trade name, produced by KAO Co.) were charged, 5 parts of styrene were further added, and then were mixed to obtain a monomer emulsion for first stage polymerization. The temperature of the first stage monomer emulsion was raised to 70° C.(First stage polymerization temperature), and 0.25 part of "VA-086" was added to initiate polymerization reaction for producing a nonionic polymer(A).

After one hour from the initiation of polymerization, the temperature was raised to 80° C.(Second stage polymerization temperature), and the second stage monomer emulsion was added over 3 hours. After the complete addition of the second stage monomer emulsion, the polymerization ran more than 2 hours. The polymerization conversion ratio was 98%. Then, the remainder of the monomer was removed by an ordinary removing method, and the solid content was regulated to obtain latex of a nonionic polymer(A) having solid content of 40% and having particle size of 0.185 micron.

In order to obtain an anode paste, 100 parts of misch metal powder of nickel alloy($AB_5$ type alloy) as the hydridable alloy, 1 part of carbon black ("Ketchen black EC" as trade name, produced by Ketchen Co.) as the conductive material, 1 part(as solid) of polytetrafluoroethylene dispersion, 0.5 part(as solid) of the nonionic polymer(A) latex, and 0.5 part of carboxymethylcellulose were kneaded.

The resulting anode paste was applied on nickel plated punched metal(the anode collector) and dried at 80° C. The anode electrode was sized for the desired thickness and size by either roll press equipment or cutter. Neither crack nor splinter was found on the resultant anode electrode.

In order to obtain a cathode paste, 100 parts of nickel hydroxide powder, 6 parts of cobalt oxide, 3 parts(as solid) of polytetrafluoroethylene dispersion, and 1 part of carboxymethylcellulose were kneaded.

The resultant cathode paste was applied on foamed metal (the cathode collector) and dried. The cathode electrode was sized for the desired thickness and size.

A separator made of Nylon non-woven fabric was held between the cathode electrode and the anode electrode. The layered combination of the anode electrode, the separator and the cathode electrode was rolled into a scroll. The scroll was placed in a closed-end cylindrical cell case having the size of AA which served as an anode electrode terminal, and 31% aqueous solution of potassium hydroxide as the electrolyte was poured in the cell case, followed by fitting a battery cover as a cathode electrode terminal to the top of the cell case, to obtain a sealed cylindrical battery having a rated capacity of 1000 mAh.

The resultant battery was charged to 150% of the rated capacity at 1 coulomb, and was discharged at 1 coulomb under a cut-off voltage of 1.0 volt. The charge and discharge cycle was repeated, and the number of cycles until the capacity was reduced to 700 mAh was recorded.

EXAMPLES 2 TO 7 AND COMPARATIVE EXAMPLES 1 to 3

The nonionic polymers (B) to (F) or comparative polymers (a) to (c) were made by the same manner as described in Example 1 except that the monomer, the polymerization initiator or the surfactant described in Table 1, 2 or 3 was used. Also the batteries were made by the same manner as described in Example 1 except that the recipes described in Table 1, 2 or 3 were followed.

The results of Examples 1 to 7 and Comparative Examples 1 to 3 are shown in Table 1, 2 or 3.

As the following results described in Table 1, 2 or 3 indicate, the binder containing the nonionic polymer obtained by using nonionic surfactant such as Emulgen 985 or 920 can give the alkaline secondary battery a better cycle property than the polymer obtained by using an ionic surfactant such as DBS.

TABLE 1

|  |  | Examples | | |
|---|---|---|---|---|
|  |  | 1 | 2 | 3 |
| Recipe of anode paste |  |  |  |  |
| nonionic polymer |  | A | B | C |
| amount | [part(s)] | 0.5 | 0.3 | 1.5 |
| conductivity | [µS/cm] | 160 | 165 | 200 |
| particle size | [µm] | 0.185 | 0.165 | 0.180 |
| recipe of nonionic polymer |  |  |  |  |
| first stage |  |  |  |  |
| water | [parts] | 58 | 58 | 58 |
| St | [parts] | 5 | 5 | 5 |
| Emulgen 985 | [part(s)] | 2 | — | 2 |
| Emulgen 920 | [part(s)] | — | 2 | — |
| VA-086 | [part] | 0.25 | 0.25 | — |
| AIBN | [part] | — | — | 0.25 |
| second stage |  |  |  |  |
| water | [parts] | 46 | 46 | 46 |
| EHA | [parts] | 65 | 35 | 65 |
| BA | [part(s)] | — | 30 | — |
| St | [parts] | 30 | 30 | 30 |
| MA | [part] | — | — | 0.1 |
| Emulgen 985 | [parts] | 3 | 3 | 3 |
| VA-086 | [parts] | 2.75 | 2.75 | 2.75 |
| misch metal of nickel alloy | [parts] | 100 | 100 | 100 |
| Ketchen black EC | [part] | 1 | 1 | 1 |
| PTFE | [part(s)] | 1 | 1 | 2 |
| CMC | [part(s)] | 0.5 | 1 | 2 |
| Existence of crack or splinter |  | NO | NO | NO |
| Number of cycles |  | >500 | >500 | 486 |

TABLE 2

|  |  | Examples | | | |
| --- | --- | --- | --- | --- | --- |
|  |  | 4 | 5 | 6 | 7 |
| Recipe of anode paste | | | | | |
| nonionic polymer |  | D | E | F | A |
| amount | [part(s)] | 1.5 | 2.0 | 0.1 | 0.5 |
| conductivity | [μS/cm] | 148 | 1450 | 171 | 160 |
| particle size | [μm] | 0.193 | 0.131 | 0.228 | 0.185 |
| recipe of nonionic polymer | | | | | |
| first stage | | | | | |
| water | [parts] | 58 | 58 | 58 | 58 |
| St | [parts] | 5 | 5 | 5 | 5 |
| Emulgen 985 | [part(s)] | — | 2 | 2 | 2 |
| Emulgen 920 | [part(s)] | 2 | — | — | — |
| VA-086 | [part] | 0.25 | — | — | 0.25 |
| AIBN | [part] | — | 0.25 | — | — |
| APS | [part] | — | — | 0.25 | — |
| second stage | | | | | |
| water | [parts] | 46 | 46 | 46 | 46 |
| EHA | [parts] | 35 | 60 | 40 | 65 |
| BA | [part(s)] | — | 30 | — | — |
| St | [part(s)] | 35 | — | 35 | 30 |
| AA | [part(s)] | — | 5 | — | — |
| EA | [part(s)] | — | — | 20 | — |
| MMA | [part(s)] | 25 | — | — | — |
| Emulgen 985 | [part(s)] | — | 3 | 3 | 3 |
| Emulgen 920 | [part(s)] | 3 | — | — | — |
| VA-086 | [part(s)] | 2.75 | — | 2.75 | 2.75 |
| AIBN | [part(s)] | — | 2.75 | — | — |
| DVB | [part(s)] | — | — | — | 3 |
| misch metal of nickel alloy | [parts] | 100 | 100 | 100 | 100 |
| Ketchen black EC | [part] | 1 | 1 | 1 | 1 |
| PTFE | [part(s)] | 1 | 2.5 | 1 | 1 |
| CMC | [part(s)] | 2.5 | — | 1.5 | 0.5 |
| Existence of crack or splinter | | NO | NO | NO | NO |
| Number of cycles | | >500 | 415 | 482 | >500 |

TABLE 3

|  |  | Comparative Examples | | |
| --- | --- | --- | --- | --- |
|  |  | 1 | 2 | 3 |
| Recipe of anode paste | | | | |
| polymer |  | a | b | c |
| amount | [part] | 0.5 | 0.2 | 0.5 |
| conductivity | [μS/cm] | 2200 | 3460 | 3120 |
| particle size | [μm] | 0.135 | 0.150 | 0.210 |
| recipe of nonionic polymer | | | | |
| first stage | | | | |
| water | [parts] | 58 | 58 | 58 |
| St | [parts] | 5 | 5 | 5 |
| Levenol WZ | [part] | 0.35 | — | — |
| DBS | [part] | — | 0.2 | — |
| Emulgen 920 | [part(s)] | — | — | 2 |
| VA-086 | [part] | 0.25 | — | 0.5 |
| AIBN | [part] | — | 0.25 | — |
| second stage | | | | |
| water | [parts] | 46 | 46 | 46 |
| EHA | [parts] | 65 | 65 | 45 |
| St | [parts] | 30 | 30 | 15 |
| AA | [part(s)] | — | — | 35 |
| Levenol WZ | [part] | 0.7 | — | — |
| DBS | [part] | — | 0.6 | — |
| Emulgen 920 | [part(s)] | — | — | 3 |
| VA-086 | [part(s)] | 2.75 | — | 0.5 |
| AIBN | [part(s)] | — | 2.75 | — |
| misch metal of nickel alloy | [parts] | 100 | 100 | 100 |
| Ketchen black EC | [part] | 1 | 1 | 1 |
| PTFE | [part(s)] | 1 | 1 | 2 |
| CMC | [part(s)] | 0.5 | 1 | 2 |
| Existence of crack or splinter | | NO | YES | NO |
| Number of cycles | | 251 | — | 289 |

EHA: 2-ethylhexyl acrylate;
BA: butyl acrylate;
EA: ethyl acrylate;
St: styrene;
AA: acrylic acid;
MA: methacrylic acid;
MMA: methyl methacrylate;
Emulgen 985: polyoxyethylene nonyl phenyl ether (oxyethylene polymerization degree is 85, nonionic surfactant produced by KAO Co.);
Emulgen 920: polyoxyethylene nonyl phenyl ether (oxyethylene polymerization degree is 20, nonionic surfactant produced by KAO Co.);

-continued

| | |
|---|---|
| Levenol WZ: | polyoxyethylene nonyl phenyl ether sodium sulfate (oxyethylene polymerization degree is 20, anionic surfactant produced by KAO Co.); |
| DBS: | dodecyl benzene sodium sulfonate (anionic surfactant); |
| VA-086: | 2,2'-azobis(2-methyl-N-(2-hydroxyethyl)propion amide) (produced by WAKO JUNYAKU Ind. Co.); |
| AIBN: | azobis-isobutylonitrile; |
| APS: | anmonium persulfate; |
| PTFE: | polytetrafluoroethylene; |
| CMC: | carboxy methyl cellulose; |
| DVB: | di-vinyl benzene; |

We claim:

1. An alkaline secondary battery, comprising:
an electrolyte;
at least one cathode electrode and
at least one anode electrode having an anode collector and
an anode active material layer bound on the anode collector,
wherein the anode active material layer comprises
an anode active material and
an anode binder which includes a nonionic polymer having an electric conductivity of not more than 2000 $\mu$S/cm, wherein the nonionic polymer is produced by emulsion polymerization of at least one nonionic monomer in the presence of a nonionic surfactant,
wherein the cathode electrode and the anode electrode are at least partially surrounded by the electrolyte;
wherein the nonionic polymer is other than polytetrafluoroethylene; and
wherein when the nonionic polymer is a polyacrylate, the polyacrylate is produced by emulsion polymerization of an acrylic acid ester.

2. The alkaline secondary battery according to claim 1, wherein the anode active material layer further comprises a conductive material.

3. The alkaline secondary battery according to claim 1, further comprising a separator which is positioned between the cathode electrode and the anode electrode.

4. An anode electrode for an alkaline secondary battery, comprising:
an anode collector and
an anode active material layer bound on the anode collector, wherein the anode active material layer comprises
an anode active material and
an anode binder which includes a nonionic polymer having an electric conductivity of not more than 2000 $\mu$S/cm, wherein the nonionic polymer is produced by emulsion polymerization of at least one nonionic monomer in the presence of a nonionic surfactant;
wherein the nonionic polymer is other than polytetrafluoroethylene; and
wherein when the nonionic polymer is a polyacrylate, the polyacrylate is produced by emulsion polymerization of an acrylic acid ester.

5. The anode electrode according to claim 4, wherein the nonionic polymer has an electric conductivity of not more than 1000 $\mu$S/cm.

6. The anode electrode according to claim 4, wherein the nonionic surfactant comprises at least one polyoxyethylene-alkyl-aryl-ether.

7. The anode electrode according to claim 4, wherein the nonionic monomer includes acrylate or methacrylate.

8. The anode electrode according to claim 4, wherein the anode binder further includes another polymer(X).

9. The anode electrode according to claim 8, wherein the polymer(X) comprises a water-insoluble polymer.

10. The anode electrode according to claim 8, wherein the polymer(X) comprises a water-soluble polymer.

11. The anode electrode according to claim 8, wherein the polymer(X) is a composition including at least one water-insoluble polymer and at least one water-soluble polymer.

12. The anode electrode according to claim 9, wherein the water-insoluble polymer is fluorine containing polymer.

13. The anode electrode according to claim 4, wherein the nonionic polymer is produced by emulsion polymerization of the nonionic monomer in the presence of the nonionic surfactant and a nonionic polymerization initiator.

14. A method for producing an anode electrode for an alkaline secondary battery, comprising the steps of:
emulsion polymerizing at least one nonionic monomer in the presence of a nonionic surfactant to produce a nonionic polymer;
preparing an anode binder by including the nonionic polymer;
blending an anode active material and an anode binder to obtain a paste;
spreading the paste on an anode collector; and then
drying the paste;
wherein the nonionic polymer is other than polytetrafluoroethylene; and
wherein when the nonionic polymer is a polyacrylate, the polyacrylate is produced by emulsion polymerization of an acrylic acid ester.

15. The method according to claim 14, wherein the nonionic polymer has an electric conductivity of not more than 2000 $\mu$S/cm.

16. The method according to claim 14, wherein the anode active material is a hydridable alloy.

17. The method according to claim 14, wherein the nonionic monomer includes acrylate or methacrylate.

18. The method according to claim 14, wherein the anode binder further includes at least one water-insoluble polymer and at least one water-soluble polymer.

19. The method according to claim 18, wherein the water-insoluble polymer is fluorine containing polymer.

20. The method according to claim 14, wherein the nonionic polymer is produced by emulsion polymerization of the nonionic monomer in the presence of the nonionic surfactant and a nonionic polymerization initiator.

21. An alkaline secondary battery, comprising:
an electrolyte;
at least one cathode electrode and
at least one anode electrode having
an anode collector and
an anode active material layer bound on the anode collector,
wherein the anode active material layer comprises
an anode active material and
an anode binder which includes a nonionic polymer having an electric conductivity of not more than 500 $\mu$S/cm,
wherein the cathode electrode and the anode electrode are at least partially surrounded by the electrolyte.

22. The alkaline secondary battery according to claim 1, wherein the anode binder contains a nonionic polymer produced by the emulsion polymerization of at least one monomer selected from the group consisting of methyl acrylate, ethyl acrylate, propyl acrylate, isopropyl acrylate, n-butyl acrylate, isobutyl acrylate, n-amyl acrylate, isoamyl acrylate, n-hexyl acrylate, 2-ethylhexyl acrylate, hydroxypropyl acrylate, lauryl acrylate, methyl crotonate, ethyl crotonate, propyl crotonate, butyl crotonate, isobutyl crotonate, n-amyl crotonate, isoamyl crotonate, n-hexyl crotonate, 2-ethylhexyl crotonate, hydroxypropyl crotonate, methyl methacrylate, ethyl methacrylate, n-butyl methacrylate, isobutyl methacrylate, tert-butyl methacrylate, 2-ethylhexyl methacrylate, lauryl methacrylate tridodecyl methacrylate, stearyl methacrylate, 1,3-butadiene, isoprene, 2,3-dimethyl butadiene, piperirene, styrene, alpha-methyl styrene, beta-methyl styrene, p-tert-butyl styrene, chlorostyrene, acrylonitrile, methacrylonitrile, acrylamide, N-methylol acrylamide, N-butoxymethyl acrylamide, methacrylamide, N-methylol methacrylamide, N-butoxymethyl methacrylamide, glycidyl acrylate, glycidyl methacrylate, allyl glycidyl ether, diethylaminoethyl methacrylate, diethylaminoethyl methacrylate, methoxy poly-ethyleneglycol mono-methacrylate.

23. The anode electrode according to claim 4, wherein the anode binder contains a nonionic polymer produced by the emulsion polymerization of at least one monomer selected from the group consisting of methyl acrylate, ethyl acrylate, propyl acrylate, isopropyl acrylate, n-butyl acrylate, isobutyl acrylate, n-amyl acrylate, isoamyl acrylate, n-hexyl acrylate, 2-ethylhexyl acrylate, hydroxypropyl acrylate, lauryl acrylate, methyl crotonate, ethyl crotonate, propyl crotonate, butyl crotonate, isobutyl crotonate, n-amyl crotonate, isoamyl crotonate, n-hexyl crotonate, 2-ethylhexyl crotonate, hydroxypropyl crotonate, methyl methacrylate, ethyl methacrylate, n-butyl methacrylate, isobutyl methacrylate, tert-butyl methacrylate, 2-ethylhexyl methacrylate, lauryl methacrylate tridodecyl methacrylate, stearyl methacrylate, 1,3-butadiene, isoprene, 2,3-dimethyl butadiene, piperirene, styrene, alpha-methyl styrene, beta-methyl styrene, p-tert-butyl styrene, chlorostyrene, acrylonitrile, methacrylonitrile, acrylamide, N-methylol acrylamide, N-butoxymethyl acrylamide, methacrylamide, N-methylol methacrylamide, N-butoxymethyl methacrylamide, glycidyl acrylate, glycidyl methacrylate, allyl glycidyl ether, diethylaminoethyl methacrylate, diethylaminoethyl methacrylate, methoxy poly-ethyleneglycol mono-methacrylate.

24. The method according to claim 14, wherein the anode binder contains a nonionic polymer produced by the emulsion polymerization of at least one monomer selected from the group consisting of methyl acrylate, ethyl acrylate, propyl acrylate, isopropyl acrylate, n-butyl acrylate, isobutyl acrylate, n-amyl acrylate, isoamyl acrylate, n-hexyl acrylate, 2-ethylhexyl acrylate, hydroxypropyl acrylate, lauryl acrylate, methyl crotonate, ethyl crotonate, propyl crotonate, butyl crotonate, isobutyl crotonate, n-amyl crotonate, isoamyl crotonate, n-hexyl crotonate, 2-ethylhexyl crotonate, hydroxypropyl crotonate, methyl methacrylate, ethyl methacrylate, n-butyl methacrylate, isobutyl methacrylate, tert-butyl methacrylate, 2-ethylhexyl methacrylate, lauryl methacrylate tridodecyl methacrylate, stearyl methacrylate, 1,3-butadiene, isoprene, 2,3-dimethyl butadiene, piperirene, styrene, alpha-methyl styrene, beta-methyl styrene, p-tert-butyl styrene, chlorostyrene, acrylonitrile, methacrylonitrile, acrylamide, N-methylol acrylamide, N-butoxymethyl acrylamide, methacrylamide, N-methylol methacrylamide, N-butoxymethyl methacrylamide, glycidyl acrylate, glycidyl methacrylate, allyl glycidyl ether, diethylaminoethyl methacrylate, and diethylaminoethyl methacrylate, methoxy poly-ethyleneglycol mono-methacrylate.

25. The alkaline secondary battery according to claim 22, wherein the anode binder contains a nonionic polymer and a water-insoluble polymer selected from the group consisting of polytetrafluoroethylene, polyvinylidenefluoride, fluororubber, polyolefin, polybutadiene, polyisoprene, styrene-1,3-butadiene copolymer, styrene-isoprene copolymer, styrene-1,3-butadiene-isoprene copolymer, 1,3-butadiene-acrylonitrile copolymer, 1,3-butadiene-isoprene-acrylonitrile copolymer, styrene-acrylonitrile-1,2-butadiene copolymer, styrene-acrylonitrile-1,3-butadiene-itaconic acid copolymer, styrene-acrylonitrile-1,3-butadiene-methylmethacrylate-fumaric acid copolymer, styrene-1,3-butadiene-itaconic acid-methylmethacrylate-acrylonitrile copolymer, and polystyrene-polybutadiene block copolymer.

26. The anode electrode according to claim 23, wherein the anode binder contains a nonionic polymer and a water-insoluble polymer selected from the group consisting of polytetrafluoroethylene, polyvinylidenefluoride, fluororubber, polyolefin, polybutadiene, polyisoprene, styrene-1,3-butadiene copolymer, styrene-isoprene copolymer, styrene-1,3-butadiene-isoprene copolymer, 1,3-butadiene-acrylonitrile copolymer, 1,3-butadiene-isoprene-acrylonitrile copolymer, styrene-acrylonitrile-1,2-butadiene copolymer, styrene-acrylonitrile-1,3-butadiene-itaconic acid copolymer, styrene-acrylonitrile-1,3-butadiene-methylmethacrylate-fumaric acid copolymer, styrene-1,3-butadiene-itaconic acid-methylmethacrylate-acrylonitrile copolymer, and polystyrene-polybutadiene block copolymer.

27. The method according to claim 24, wherein the anode binder contains a nonionic polymer and a water-insoluble polymer selected from the group consisting of polytetrafluoroethylene, polyvinylidenefluoride, fluororubber, polyolefin, polybutadiene, polyisoprene, styrene-1,3-butadiene copolymer, styrene-isoprene copolymer, styrene-1,3-butadiene-isoprene copolymer, 1,3-butadiene-acrylonitrile copolymer, 1,3-butadiene-isoprene-acrylonitrile copolymer, styrene-acrylonitrile-1,2-butadiene copolymer, styrene-acrylonitrile-1,3-butadiene-itaconic acid copolymer, styrene-acrylonitrile-1,3-butadiene-methylmethacrylate-fumaric acid copolymer, styrene-1,3-butadiene-itaconic acid-methylmethacrylate-acrylonitrile copolymer, and polystyrene-polybutadiene block copolymer.

* * * * *